United States Patent
Sahota et al.

(10) Patent No.: US 8,296,792 B2
(45) Date of Patent: Oct. 23, 2012

(54) METHOD AND SYSTEM TO PROVIDE INTERACTIVITY USING AN INTERACTIVE CHANNEL BUG

(75) Inventors: Ranjit Sahota, Fairfax, CA (US); John Carney, Sausalito, CA (US)

(73) Assignee: TVWorks, LLC, Philadelphia, PA (US)

( * ) Notice: Subject to any disclaimer, the term of this patent is extended or adjusted under 35 U.S.C. 154(b) by 914 days.

(21) Appl. No.: 09/841,018

(22) Filed: Apr. 23, 2001

(65) Prior Publication Data

US 2001/0047518 A1    Nov. 29, 2001

Related U.S. Application Data

(60) Provisional application No. 60/199,686, filed on Apr. 24, 2000.

(51) Int. Cl.
*H04N 7/10*    (2006.01)

(52) U.S. Cl. ............... 725/34; 725/40; 725/45; 725/51; 725/52; 725/139

(58) Field of Classification Search .......... 725/14, 725/34, 36, 37, 38, 39, 43, 45, 54, 61, 100, 725/131, 139, 40, 49, 51–52; 348/564, 569
See application file for complete search history.

(56) References Cited

U.S. PATENT DOCUMENTS

| | | | |
|---|---|---|---|
| 4,647,974 A | 3/1987 | Butler et al. | |
| 5,469,206 A | 11/1995 | Strubbe et al. | |
| 5,485,221 A | 1/1996 | Banker et al. | |
| 5,579,057 A * | 11/1996 | Banker et al. | .......... 348/589 |
| 5,592,551 A | 1/1997 | Lett et al. | |
| 5,600,364 A | 2/1997 | Hendricks et al. | |
| 5,671,377 A | 9/1997 | Bleidt et al. | |
| 5,689,799 A | 11/1997 | Dougherty et al. | |
| 5,706,434 A | 1/1998 | Kremen et al. | |
| 5,708,845 A | 1/1998 | Wistendahl et al. | |
| 5,727,159 A | 3/1998 | Kikinis | |
| 5,742,680 A | 4/1998 | Wilson | |
| 5,774,664 A | 6/1998 | Hidary et al. | .......... 395/200.48 |
| 5,774,666 A | 6/1998 | Portuesi | |
| 5,809,242 A | 9/1998 | Shaw et al. | |
| 5,819,269 A | 10/1998 | Uomini | |
| 5,826,258 A | 10/1998 | Gupta et al. | |

(Continued)

FOREIGN PATENT DOCUMENTS

EP    0942595 A2    9/1999

OTHER PUBLICATIONS

International Search Report, Oct. 10, 2001.

(Continued)

*Primary Examiner* — Kristine Kincaid
*Assistant Examiner* — Sumaiya A Chowdhury
(74) *Attorney, Agent, or Firm* — Banner & Witcoff, Ltd.

(57) ABSTRACT

A method and system are disclosed to provided interactivity using an interactive channel bug. The interactive channel bug (e.g., an "interactive broadcast channel branding logo") allows a television user to access a variety of interactive services. The interactive broadcast channel branding logo may be configured to launch a functionality determined by a broadcaster. This functionality may change over time. The form of the interactive broadcast channel branding logo may also change over time in which the availability of new interactive services is indicated.

17 Claims, 7 Drawing Sheets

U.S. PATENT DOCUMENTS

| | | | |
|---|---|---|---|
| 5,872,588 A | 2/1999 | Aras et al. | |
| 5,895,477 A | 4/1999 | Orr et al. | |
| 5,929,849 A | 7/1999 | Kikinis | |
| 5,937,331 A | 8/1999 | Kalluri et al. | |
| 5,961,603 A | 10/1999 | Kunkel et al. | 709/229 |
| 5,969,715 A | 10/1999 | Dougherty et al. | |
| 5,982,445 A | 11/1999 | Eyer et al. | 348/461 |
| 6,002,394 A * | 12/1999 | Schein et al. | 725/39 |
| 6,006,256 A | 12/1999 | Zdepski et al. | |
| 6,008,836 A * | 12/1999 | Bruck et al. | 725/131 |
| 6,014,134 A | 1/2000 | Bell et al. | |
| 6,014,502 A | 1/2000 | Moraes | |
| 6,018,764 A | 1/2000 | Field et al. | |
| 6,018,768 A | 1/2000 | Ullman et al. | |
| 6,025,837 A | 2/2000 | Matthews, III et al. | |
| 6,049,333 A | 4/2000 | LaJoie et al. | |
| 6,076,734 A | 6/2000 | Dougherty et al. | |
| 6,101,510 A | 8/2000 | Stone et al. | |
| 6,169,543 B1 | 1/2001 | Wehmeyer | |
| 6,182,072 B1 | 1/2001 | Leak et al. | |
| 6,188,398 B1 | 2/2001 | Collins-Rector et al. | |
| 6,205,582 B1 | 3/2001 | Hoarty | |
| 6,209,130 B1 | 3/2001 | Rector, Jr. et al. | |
| 6,219,042 B1 | 4/2001 | Anderson et al. | |
| 6,230,319 B1 | 5/2001 | Britt, Jr. et al. | |
| 6,233,546 B1 | 5/2001 | Datig | |
| 6,233,592 B1 | 5/2001 | Schnelle et al. | |
| 6,237,022 B1 | 5/2001 | Bruck et al. | |
| 6,240,555 B1 | 5/2001 | Shoff et al. | |
| 6,253,238 B1 * | 6/2001 | Lauder et al. | 709/217 |
| 6,275,989 B1 | 8/2001 | Broadwin et al. | |
| 6,295,058 B1 * | 9/2001 | Hsu et al. | 715/769 |
| 6,301,584 B1 | 10/2001 | Ranger | |
| 6,308,206 B1 | 10/2001 | Singh | |
| 6,327,574 B1 | 12/2001 | Kramer et al. | |
| 6,338,094 B1 | 1/2002 | Scott et al. | |
| 6,345,292 B1 | 2/2002 | Daugherty et al. | |
| 6,357,042 B2 | 3/2002 | Srinivasan et al. | |
| 6,363,525 B1 * | 3/2002 | Dougherty et al. | 725/34 |
| 6,373,609 B1 | 4/2002 | Mizrahi | |
| 6,415,303 B1 | 7/2002 | Meier et al. | |
| 6,424,717 B1 | 7/2002 | Pinder et al. | |
| 6,430,624 B1 | 8/2002 | Jamtgaard et al. | |
| 6,446,261 B1 * | 9/2002 | Rosser | 725/34 |
| 6,457,103 B1 | 9/2002 | Challenger et al. | |
| 6,459,427 B1 | 10/2002 | Mao et al. | |
| 6,460,180 B1 | 10/2002 | Park et al. | |
| 6,473,609 B1 | 10/2002 | Schwartz et al. | |
| 6,473,858 B1 | 10/2002 | Shimomura et al. | |
| 6,496,981 B1 | 12/2002 | Wistendahl et al. | |
| 6,510,557 B1 | 1/2003 | Thrift | |
| 6,513,019 B2 | 1/2003 | Lewis | |
| 6,513,160 B2 * | 1/2003 | Dureau | 725/9 |
| 6,516,349 B1 | 2/2003 | Lieberman | |
| 6,518,950 B1 | 2/2003 | Dougherty et al. | |
| 6,536,041 B1 * | 3/2003 | Knudson et al. | 725/39 |
| 6,542,593 B1 | 4/2003 | Bowman-Amuah | |
| 6,546,488 B2 | 4/2003 | Dillon et al. | |
| 6,564,251 B2 | 5/2003 | Katariya et al. | |
| 6,564,263 B1 | 5/2003 | Bergman et al. | |
| 6,571,392 B1 | 5/2003 | Zigmond et al. | |
| 6,574,793 B1 * | 6/2003 | Ngo et al. | 725/32 |
| 6,574,795 B1 | 6/2003 | Carr | |
| 6,577,346 B1 | 6/2003 | Perlman | |
| 6,584,153 B1 * | 6/2003 | Gordon et al. | 375/240.13 |
| 6,601,103 B1 | 7/2003 | Goldschmidt Iki et al. | |
| 6,614,914 B1 | 9/2003 | Rhoads et al. | |
| 6,615,408 B1 | 9/2003 | Kaiser et al. | |
| 6,637,032 B1 | 10/2003 | Feinleib | |
| 6,643,652 B2 | 11/2003 | Helgeson et al. | |
| 6,651,218 B1 | 11/2003 | Adler et al. | |
| 6,654,754 B1 | 11/2003 | Knauft et al. | |
| 6,668,378 B2 | 12/2003 | Leak et al. | |
| 6,675,350 B1 | 1/2004 | Abrams et al. | |
| 6,676,350 B1 | 1/2004 | McSherry et al. | |
| 6,698,020 B1 | 2/2004 | Zigmond et al. | |
| 6,698,023 B2 | 2/2004 | Levitan | |
| 6,718,551 B1 | 4/2004 | Swix et al. | |
| 6,725,461 B1 * | 4/2004 | Dougherty et al. | 725/40 |
| 6,730,624 B2 | 5/2004 | Motoki et al. | |
| 6,735,487 B1 * | 5/2004 | Marshall et al. | 700/90 |
| 6,742,043 B1 | 5/2004 | Moussa et al. | |
| 6,745,368 B1 | 6/2004 | Boucher et al. | |
| 6,750,919 B1 * | 6/2004 | Rosser | 348/584 |
| 6,756,997 B1 * | 6/2004 | Ward et al. | 715/716 |
| 6,779,154 B1 | 8/2004 | Nussbaum et al. | |
| 6,792,616 B1 * | 9/2004 | Jerding et al. | 725/38 |
| 6,799,326 B2 | 9/2004 | Boylan, III et al. | |
| 6,799,327 B1 * | 9/2004 | Reynolds et al. | 725/42 |
| 6,826,597 B1 | 11/2004 | Lonnroth et al. | |
| 6,839,903 B1 | 1/2005 | Shintani et al. | |
| 6,847,969 B1 | 1/2005 | Mathai et al. | |
| 6,925,595 B1 | 8/2005 | Whitledge et al. | |
| 6,934,963 B1 | 8/2005 | Reynolds et al. | |
| 6,938,270 B2 | 8/2005 | Blackketter et al. | |
| 7,028,327 B1 | 4/2006 | Dougherty et al. | |
| 7,062,777 B2 * | 6/2006 | Alba et al. | 725/39 |
| 7,079,176 B1 * | 7/2006 | Freeman et al. | 348/207.1 |
| 7,080,039 B1 | 7/2006 | Marsh | |
| 7,100,183 B2 | 8/2006 | Kunkel et al. | |
| 7,103,605 B1 | 9/2006 | Hazi et al. | |
| 7,103,904 B1 | 9/2006 | Blackketter et al. | |
| 7,143,042 B1 | 11/2006 | Sinai et al. | |
| 7,222,163 B1 | 5/2007 | Girouard et al. | |
| 7,287,018 B2 | 10/2007 | Lennon | |
| 7,500,188 B1 | 3/2009 | Trapani et al. | |
| 7,650,376 B1 | 1/2010 | Blumenau | |
| 2001/0003212 A1 | 6/2001 | Marler et al. | |
| 2001/0011265 A1 | 8/2001 | Cuan et al. | |
| 2001/0027491 A1 | 10/2001 | Terretta et al. | |
| 2001/0037500 A1 | 11/2001 | Reynolds et al. | |
| 2001/0054031 A1 | 12/2001 | Lee et al. | |
| 2002/0046273 A1 | 4/2002 | Lahr et al. | |
| 2002/0104086 A1 | 8/2002 | Tomsen et al. | |
| 2002/0184627 A1 * | 12/2002 | Alba et al. | 725/39 |
| 2003/0023971 A1 | 1/2003 | Martinolich et al. | |
| 2004/0006747 A1 | 1/2004 | Tyler | |
| 2004/0133910 A1 * | 7/2004 | Gordon et al. | 725/37 |
| 2005/0114757 A1 | 5/2005 | Sahota et al. | |
| 2005/0193410 A1 | 9/2005 | Eldering | |
| 2010/0268773 A1 | 10/2010 | Hunt et al. | |

OTHER PUBLICATIONS

"Spyglass Prism: Concepts and Applications", Spyglass Inc, 1997, pp. 1-8.

Puder, A., et al, "Position Papers: System Support for Knowledge-Based Trading in Open Service Markets", Proceedings of the 7th Workshop on ACM SIGOPS European Workshop: Systems Support for Worldwide Applications, Sep. 1996, pp. 289-296.

Ensink, Brian, et al, "XML Based Adaptation of the Composite Approach for Database Integration", Proceedings of the 37th Annual Southeast Regional Conference (CD-ROM), Apr. 1999, pp. 1-6.

Arens, Yigal, et al, "Intelligent Caching: Selecting, Representing, and Reusing Data in an Information Server", Proceedings of the Third International Conference on Information and Knowledge Management, Nov. 1994, pp. 433-438.

Spencer, Ken, "Using XML to Build Internet Solutions", Windows IT Pro, http://www.winntmag.com/Articles/Print.cfm?ArticleID=5056, Apr. 1999.

Bayardo, R J., et al., "InfoSleuth: Agent-Based Semantic Integration of Information in Open and Dynamic Environments", ACM SIGMOD Record, (Jun. 1997),vol. 26, Issue 2, pp. 195-206.

Calvary, Gaelle , et al., "From Single-User Architectural Design to PAC': a Generic Software Architecture Model for CSCW", Proceedings of the SIGCHI Conference on Human Factors in Computing Systems, (Mar. 1997),pp. 342-349.

Wegner, Lutz, et al, "Applications: A Visual Interface for Synchronous Collaboration and Negotiated Transactions", Proceedings of the Workshop on Advanced Visual Interfaces, May 1996, pp. 156-165.

Bulterman, Dick C., "Embedded Video in Hypermedia Documents: Supporting Integration and Adaptive Control", ACM Transactions on Information Systems (TOIS), vol. 13, Issue 4, Oct. 1995, pp. 440-470.

Hijiri, Toshiki, et al, "A Spatial Hierarchical Compression Method for 3D Streaming Animation", Proceedings of the Fifth Symposium on Virtual Reality Modeling Language (Web3D-VRML), Feb. 2000, pp. 95-101.

Glushko, Robert J., et al, "An XML Framework for Agent-Based E-Commerce", Communications of the ACM, vol. 42, No. 3, Mar. 1999, pp. 106-114.

Claypool, Kajal, et al., "OQL_SERF: An ODMG Implementation of the Template-Based Schema Evolution Framework", Proceedings of the 1998 Conference of the Centre for Advanced Studies on Collaborative Research, (Nov. 1998),pp. 1-15.

Fraisse, S , et al., "Generating Hypermedia Form Specifications by Sketching Multimedia Templates", ACM, (1996), pp. 353-363.

Iyengar, Arun , et al., "Improving Web Server Performance by Caching Dynamic Data", proceedings of the USENIX Symposium on Internet Technologies and Systems, (Dec. 1997),pp. 1-13.

Puerta, Angel, et al., "Towards a General Computational Framework for Model-Based Interface Development", Proceedings of the 4th International Conference on Intelligent User Interfaces, (Dec. 1998),pp. 171-178.

Shim, Simon S., et al., "Template Based Synchronized Multimedia Integration Language Authoring Tool", SPIE Conference on Internet Imaging, (Dec. 1999),vol. 3964, pp. 134-142.

"XHTML 1.0: The Extensible HyperText Markup Language, A Reformulation of HTML 4.0 in XML 1.0", www.w3.org, downloaded from http://www.w3.org/TR/19991WD-html-in-xml-199902241, Feb. 24, 1999, pp. 1-15.

Barta, Robert, et al, "Syndication with JML", Proceedings of the 2000 ACM Symposium on Applied Computing—vol. 2, ACM Press, Mar. 2000, pp. 962-970.

Kuchling, Andrew, "XML, the eXtensible Markup Language", Linux Journal, Specialized Systems Consultants, Inc., Nov. 1998, pp. 1-3.

Microsoft Computer Dictionary, Third Edition, Microsoft Press, 1997. p. 505.

Smith, John R., et al. "Scalable Multimedia Delivery for Pervasive Computing", Proceedings of the Seventh ACM International Conference on Multimedia (Part 1), Oct.1999, pp. 131-140.

Microsoft Computer Dictionary, Third Edition, Microsoft Press, 1997, pp. 368.

Palmer, Jonathan W., et al, "Digital Newspapers Explore Marketing on the Internet", Communications of the ACM, vol. 42, Issue 9, Sep. 1999, pp. 32-40.

Hodes, Todd D., et al, "Composable Ad Hoc Location-Based Services for Heterogeneous Mobile Clients", Wireless Networks, vol. 5, Issue 5, Oct. 1999, pp. 411-427.

International Search Report for International Application No. PCT/US01/13244 (Metatv, Inc.), dated Sep. 10, 2001.

International Search Report for International Application No. PCT/US01/13243 (Metatv, Inc.) dated Oct. 10, 2001.

"Advanced Television Enhancement Forum Specification (ATVEF)", ATVEF, 34 pages, Feb. 2, 1999.

International Preliminary Examination Report, PCT/US01/13244, mailed Feb. 18, 2003 (11 pages).

* cited by examiner

METHOD AND SYSTEM TO PROVIDE INTERACTIVITY USING AN INTERACTIVE CHANNEL BUG

RELATED APPLICATION

This application is related to an claims priority to U.S. Provisional Application 60/199,686 entitled, "METHOD AND SYSTEM FOR TRANSFORMING CONTENT FOR EXECUTION ON MULTIPLE PLATFORMS," filed on Apr. 24, 2000, the disclosure of which is hereby incorporated herein by reference.

FIELD OF THE INVENTION

The present invention relates generally to interactive television. More particularly, the present invention relates to a method and system to provide interactivity using an interactive channel bug.

BACKGROUND OF THE INVENTION

As interactive television ("iTV") systems evolve to the point of offering more complex and varied services (e.g., home shopping, interactive games, home banking and other financial transactions, etc.), iTV systems tend to be complicated for users to operate the television as an interface to such services. That is, it is difficult for users to navigate through the iTV system while watching current programming content.

Past iTV systems have been limited in scope. For example, the most basic interactivity provided by iTV systems used "teletext," where cyclical digital data is inserted in the vertical blanking interval of a video signal. The net result is typically a few lines of text at the base of a television screen. Users may then use a remote control device to select television images, gain access to the Internet, and the like, from the teletext. A disadvantage of using teletext is that it is often distracting to users to see lines of text at the base of the television screen while watching a program.

Another common iTV system involves tuning to a dedicated channel associated with interactive services. A disadvantage of such a system is that users need to tune to the specific channel (and often interrupt a scheduled program) to gain access to the interactive services.

Thus, what is needed is an unobtrusive iTV system to facilitate simple interactivity for a user of the iTV system.

SUMMARY OF THE INVENTION

A method and system are disclosed to provide interactivity using an interactive channel bug. The interactive channel bug can be used to indicate or to launch interactivity. In one embodiment, the interactive channel bug is a graphical object, which includes an interactive broadcast channel branding logo that facilitates interactivity for television users. The interactive channel bug may facilitate interactivity for a user, which may use remote control commands to access the interactive channel bug. In one embodiment, any conventional channel bug (e.g., NBC's "peacock," CBS's "eye," etc.) may be made interactive by replacing the standard channel bug with interactive broadcast content.

In one embodiment, the interactive channel bug allows television users to initiate interactivity. For example, the channel bug may have an associated action that launches some functionality determined by the broadcaster. This functionality, however, may change over time. That is, through the use of broadcast enhancements, the form of the channel bug can change. This allows for the broadcaster to signal to users that new interactivity is now available.

The interactive channel bug may have multiple types of forms. In one implementation, for example, the interactive channel bug may be the standard channel bug that appears when no additional interactivity is available. The interactive channel bug can launch a rollout menu of standard services, such as news, weather, and sports related to the broadcasted content. Another channel bug form may be an animated channel bug that indicates additional interactivity associated with the current broadcast. Yet another form may be a channel bug including an image that indicates a purchase opportunity. The types of channel bugs described herein can be used to support broadcast advertising partners and to launch product purchases and/or product information services.

BRIEF DESCRIPTION OF THE DRAWINGS

The present invention is illustrated by way of example, and not limitation, by the figures of the accompanying drawings, in which like references indicate similar elements and which.

DETAILED DESCRIPTION

A method and system are described to provide interactivity using an interactive channel bug. The interactive channel bug can be used to indicate or to launch interactivity. In one embodiment, the interactive channel bug is a graphical object, which includes an interactive broadcast channel branding logo that facilitates interactivity for television users. The interactive channel bug may facilitate interactivity for a user, which may use remote control commands to access the interactive channel bug. In one embodiment, any conventional channel bug (e.g., NBC's "peacock," CBS's "eye," etc.) may be made interactive by replacing the standard channel bug with interactive broadcast content.

In one embodiment, the interactive channel bug allows television users to initiate interactivity. For example, the channel bug may have an associated action that launches some functionality determined by the broadcaster. This functionality, however, may change over time. That is, through the use of broadcast enhancements, the form of the channel bug can change. This allows for the broadcaster to signal to users that new interactivity is now available.

The interactive channel bug may have multiple types of forms. In one implementation, for example, the interactive channel bug may be the standard channel bug that appears when no additional interactivity is available. The interactive channel bug can launch a rollout menu of standard services, such as news, weather, and sports related to the broadcasted content. Another channel bug form may be an animated channel bug that indicates additional interactivity associated with the current broadcast. Yet another form may be a channel bug including an image that indicates a purchase opportunity. The types of channel bugs described herein can be used to support broadcast advertising partners and to launch product purchases and/or product information services.

Figure 1:
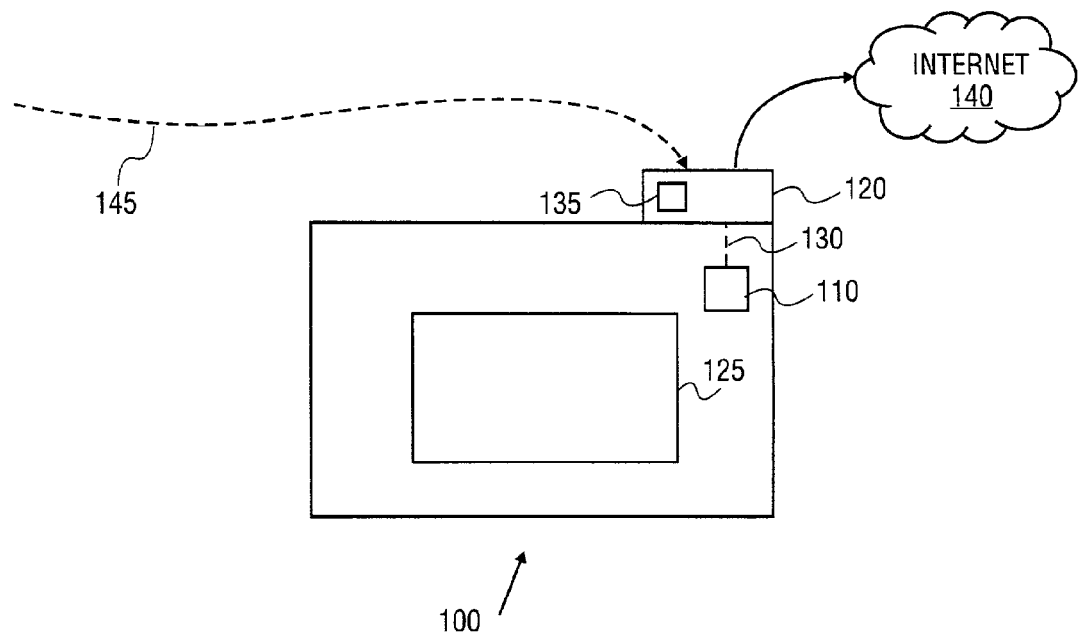
FIG. 1 illustrates an exemplary television system with Internet connectivity for practicing the present invention.

FIG. 1 illustrates an exemplary television (TV) system 100 with Internet connectivity for practicing the present invention. Referring FIG. 1, TV system 100 may be implemented in numerous configurations including a stand-alone television system, a television system including a set-top box, or even as a traditional computer with television viewing capabilities. So called interactive TV systems provide increased functionality, including interactive programming guides and the linking of hyperlinked Internet content to television content.

TV system 100 includes a television receiver 110 and a set-top box 120. Set-top box 120 can also be embedded hardware within television system 100 includes a screen 125 to display an audio/video/interactive signal 130 through television receiver/tuner, 110 which can pass through set-top box 120 or hardware internal to television system 100 that will decode broadcast signals and separate interactive content or components. Television system 100 may also contain a tuner (not shown) and other standard components of television systems. A remote control or other standard input devices such as a keyboard may be used to provide inputs to television system 100 or set-top box 120. The remote control device may be coupled to an input port 135 of set-top box 120 such as by a hard-wired connection or by way of a wireless infrared (IR) or radio frequency (RF) link.

Set-top box 120 may be connected to Internet 140 in a standard manner. Set-top box 120 or embedded decoding hardware within television system 100 can receive a television signal 145 from a terrestrial source, satellite source, or a cable source, or other like sources. In one embodiment, a user of television system 100 may use an input device (e.g., a trackball, a force-activated pointing device, a conventional joystick, etc.) to access a channel bug associated with a television program to launch interactive services in a manner that will be described in more detail below.

Figure 2:
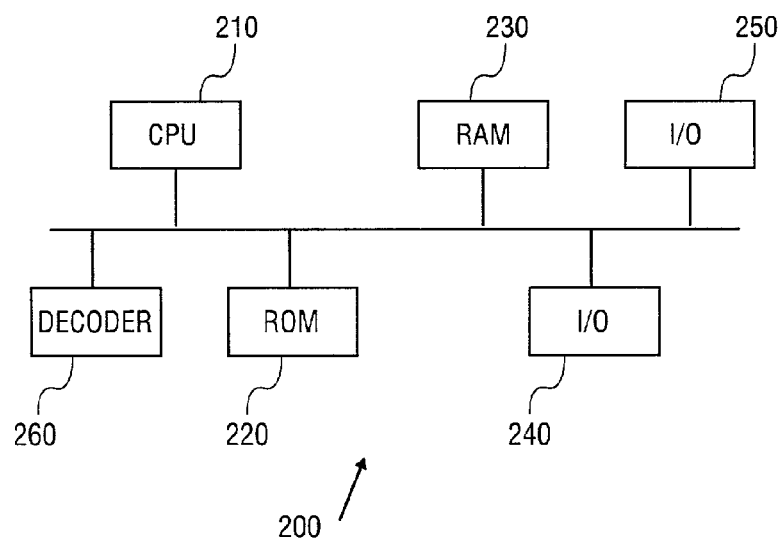
FIG. 2 illustrates a simplified internal block diagram of a set-top box according to one embodiment.

FIG. 2 illustrates a simplified internal block diagram 200 of set-top box 120 or embedded hardware in television system 100 according to one embodiment. In one embodiment, set-top box 120 is Advanced Television Enhancement Forum (ATVEF) standard compliant. That is, set-top box 120 can render web-based content with a broadcast to television system 100.

Referring to FIG. 2, set-top box 120 includes a central processing unit (CPU) 210 coupled to memory devices, which include a read-only memory (ROM) 220 a random-access memory (RAM) 230. Any number of memory devices may be included in set-top box 120. For example, a memory device may be a logical memory device to include a broadcast file system. A broadcast file system is a carousel of data flowing through a broadcast stream. In one embodiment, set-top box 120 may read data from that stream by waiting for appropriate data to pass by. CPU 210 can be coupled to a number of input/output (I/O) devices via I/O interfaces 240 and 250. CPU is also coupled to decoder 260.

CPU 210 controls the basic operation for set-top box 120. For example, CPU 210 can process inputs from a user. CPU 210 can process instructions stored in RAM 230 or ROM 220 based on the inputs from the user. Alternatively, CPU 210 can process instructions that are contained within a broadcast stream and are decoded by set-top box 120 or hardware embedded in TV system 100. In one embodiment, a "bug" and its morph instruction and content may be received within a broadcast stream. The bug can be used to launch interactivity. Additionally, the interactivity that may be launched can come from a broadcast stream or from a back channel, e.g., an Internet Protocol (IP) pathway.

Decoder 260 is a processing device that processes television signal 145. In one embodiment, decoder 260 can decode a "channel bug" inserted into television signal 145. Decoder 260 can inform CPU 210 of the inserted channel bug. Decoder 260 may inform set-top box 120 or embedded hardware to obtain a channel bug from a back channel and render it onto the display for television system 100. Decoder 260 may also inform set-top box 120 or embedded hardware in television system 100 to obtain a bug from the broadcast file system and render it on the display for television system 100. Decoder 260 may also inform such systems to render a channel bug that has already received. The same is true for morphing the interactive channel bug.

Furthermore, set-top box 120 or embedded hardware within television system 100 can decode instructions from a broadcast stream to change an interactive channel bug within a broadcast stream. In one embodiment, an interactive channel bug can be pulled from a logical drive such as the broadcast file system, a back channel, or may be implemented from assets already resident in a set-top box type receiver. The same can be applied to launching interactivity. Any number of sources can provide the interactive channel bug and interactive services.

Thus, CPU 210 or decoder 260 can perform instructions facilitated by a user accessing a channel bug. In one embodiment, CPU 210 or decoder 260 can process executable code, which may include programming code in JAVA, C++, Perl, HMTL, or other like programming code in determining at what point to morph an interactive channel bug or even the broadcast bug. Such instructions for morphing may come through the broadcast stream, over an IP pathway, or may be triggered by set-top box 120 where there is some resident code that has been initiated to trigger a signal for morphing. The instructions can also be used to make the interactive channel bug appear on television system 100 and provide interactive services.

ROM 220 or RAM 230 may include instructions and data for execution by CPU 210. RAM 230 may also be used to store program variables for programming instructions, which may be contained in ROM 220 or other types of memory. I/O interfaces 240 and 250 may include a remote control input port, a network interface, a video/audio output port, and a television signal input port, or other like interfaces. In one embodiment, I/O interface 240 or 250 is a network interface that connects to a private or public network such as Internet 140.

Figure 3A:
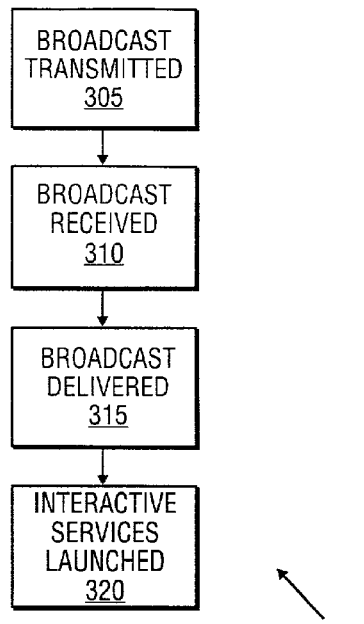
FIG. 3A illustrates a flow diagram of an operation for using an interactive broadcast channel branding logo as a launching point for interactive services according to one embodiment.

FIG. 3A illustrates a flow diagram of an operation 300 for using an interactive broadcast channel branding logo ("channel bug") as a launching point for interactive services according to one embodiment. Initially, operation 300 begins at operation 305.

At operation 305, a broadcast is transmitted. For example, a broadcast station may transmit a broadcast to set-top box 120 (or embedded TV device hardware).

At operation 310, the broadcast is received by set-top box 120. Set-top box 120 processes and decodes the received broadcast into a broadcast stream.

At operation 315, set-top box 120 delivers the broadcast stream to receiver 110 in television system 100. In one embodiment, set-top box 120 (or TV embedded hardware) decodes the broadcast stream and separates the channel bug or interactivity from the broadcast stream.

At operation 320, an interactive service is launched based on an embedded "channel bug" in the broadcast stream. Alternatively, the broadcast stream may have a trigger, to say to create or morph an interactive channel bug. Television system 100 may then retrieve and render the channel bug. Furthermore, the channel bug can be retrieved from a number of sources such as, for example, resident memory, broadcast file system, or some remote device via an IP pathway.

In one embodiment, the "channel bug" is a graphical object, which may include a broadcast channel branding logo or any other type of logo. The channel bug, or channel bug trigger, may be embedded in the broadcast stream according to numerous known technologies such as ATVEF. The channel bug may also be rendered using various methods including rendering of ATVEF compliant data. The channel bug may also be retrieved using various methods such as, for example, a broadcast file system, resident memory, or remote device via an IP pathway.

In one embodiment, a user can access the channel bug by using a remote control device to manipulate a pointer on television system 100 so that the user can "click" on the channel bug to launch interactive services. In one embodiment, the interactive services is related to the broadcast being displayed. For example, if the broadcast being displayed is related to, e.g., news, weather, or sports, a user can access the channel bug being provided with the broadcast, which may provide further services related to the broadcast. That is, if the broadcast is weather related, a user can access the channel bug to obtain weather related news for another state. In one embodiment, the channel bug is not related to broadcast content, but provides general information about the broadcaster such as, for example, what is on later, indicate message or email, indicate specials, etc.

In one embodiment, accessing the channel bug provides a rollout menu that may include hyperlinks to other information (e.g., image maps, etc.) for a user to select and access via the Internet. Of course, the remote control device could be any one of numerous control devices including a wireless keyboard, a wireless pointer device, etc. It is also possible not to use a remote control device at all, and to use just a keypad, cursor, etc., attached directly to the television system.

Figure 3B:
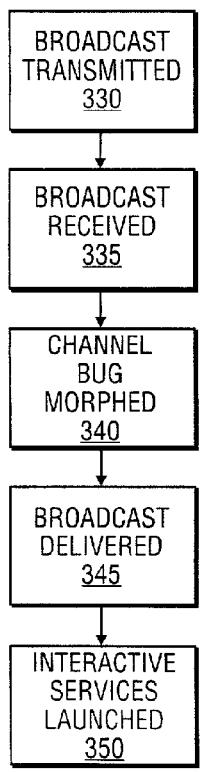
FIG. 3B illustrates a flow diagram of an operation for using an interactive broadcast channel branding logo to access interactive services associated with programming content according to one embodiment.

FIG. 3B illustrates a flow diagram of an operation 325 for using an interactive broadcast channel branding logo ("channel bug") to access interactive services associated with programming content according to one embodiment. Initially, operation 325 begins at operation 330.

At operation 330, a broadcast is transmitted. For example, a broadcast station may transmit a news related broadcast to set-top box 120.

At operation 335, the news related broadcast is received by set-top box 120. Set-top box 120 processes, decodes, and separates the received broadcast into a broadcast stream with interactivity. The interactivity may also flow through an independent pathway to the set-top box 120 such as an IP pathway. In one embodiment, set-top box 120 processes a channel bug inserted into the news related broadcast.

At operation 340, the channel bug is morphed. For example, set-top box 120 executes code in the news related broadcast stream. In one embodiment, a trigger can come through an IP pathway such as direct IP or through a multicast to trigger the channel bug. The trigger can instruct the channel bug to be displayed or to morph the channel bug based on information embedded in the news related broadcast.

At operation 345, set-top box 120 delivers the broadcast stream with the morphed channel bug to television system 100. The morphed channel bug may appear on television system 100 in a number of ways.

For example, the channel bug may change form, start flashing, and etc. to indicate to a user that interactivity is associated with channel bug for the news broadcast. In particular, the broadcaster for the news broadcast may use the channel bug to facilitate an on-line poll related to news broadcast. That is, instead of having to make a phone call or separate access the Internet, providers of the news broadcast can use the channel bug to conduct the on-line poll.

At operation 350, if a user accesses the channel bug, interactive services are launched. For example, by clicking on the channel bug, a user can access an on-line poll related to news items. The broadcaster can ask the user to "vote for a candidate" in a story covering local or national politics. Using the television screen as the interface, the user could vote for their candidate of choice. In another example, user/viewer of a game show such as "Jeopardy" can play along with contestants in which the channel bug is used as the launching point for the interactivity.

Figure 3C:
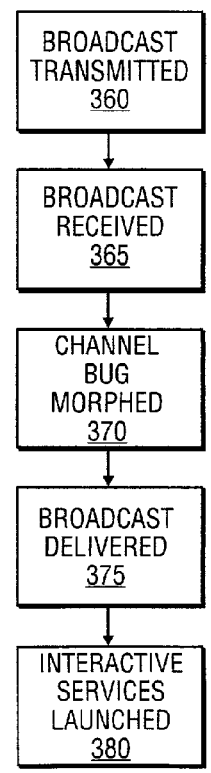
FIG. 3C illustrates a flow diagram of an operation for using an interactive broadcast channel branding logo to purchase products/services according to one embodiment.

FIG. 3C illustrates a flow diagram of an operation 355 for using an interactive broadcast channel branding logo ("channel bug") to purchase products/services according to one embodiment. Initially, operation 355 begins at operation 360.

At operation 360, a broadcast is transmitted. For example, a broadcast station may transmit an advertisement ("commercial") as a broadcast to set-top box 120. The broadcaster may allow the advertiser to use the broadcaster's bug or allow the advertiser to replace the broadcaster's bug with the advertiser's bug to indicate interactivity associated with a commercial.

At operation 365, the advertisement related broadcast is received by set-top box 120. Set-top box 120 processes and decodes the received broadcast into a broadcast stream. In one embodiment, set-top box 120 processes a channel bug inserted into the advertisement related broadcast.

At operation 370, the channel bug is morphed. For example, set-top box 120 executes code in the news related broadcast stream to morph the channel bug based on information embedded in the advertisement related broadcast. Furthermore, the code can be pulled through an IP pathway or pulled from a broadcast file system. The code or instructions for morphing a channel bus is not limited to any particular source.

At operation 375, set-top box 120 delivers the advertisement related broadcast with the morphed channel bug to television system 100. The morphed channel bug can alert a user/viewer to purchase opportunities available through television system 100. Such a feature can be useful to broadcast advertising partners by allowing the channel bug to morph during an advertisement for a particular product/service. This allows a user/viewer to purchase a product/service or to obtain additional information regarding the product/service almost immediately, which is facilitated by the channel bug.

At operation 380, if the user accesses the channel bug, interactive services are launched. For example, by clicking on the channel bug, the user can gain access to, e.g., a merchant's web site or to access local content in a resident in memory or content in a broadcast file system. Thus, the user would be able to purchase a desired product/service electronically over the Internet. It should be appreciated, of course, that a variety of purchase transaction models may be used with the present invention. In yet another embodiment, the network operator providing the broadcast may choose to replace the channel bug, or to add a network specific channel bug. The network operator, e.g., a cable system operator, can replace broadcasters' bug with their own bug.

Figure 4A:
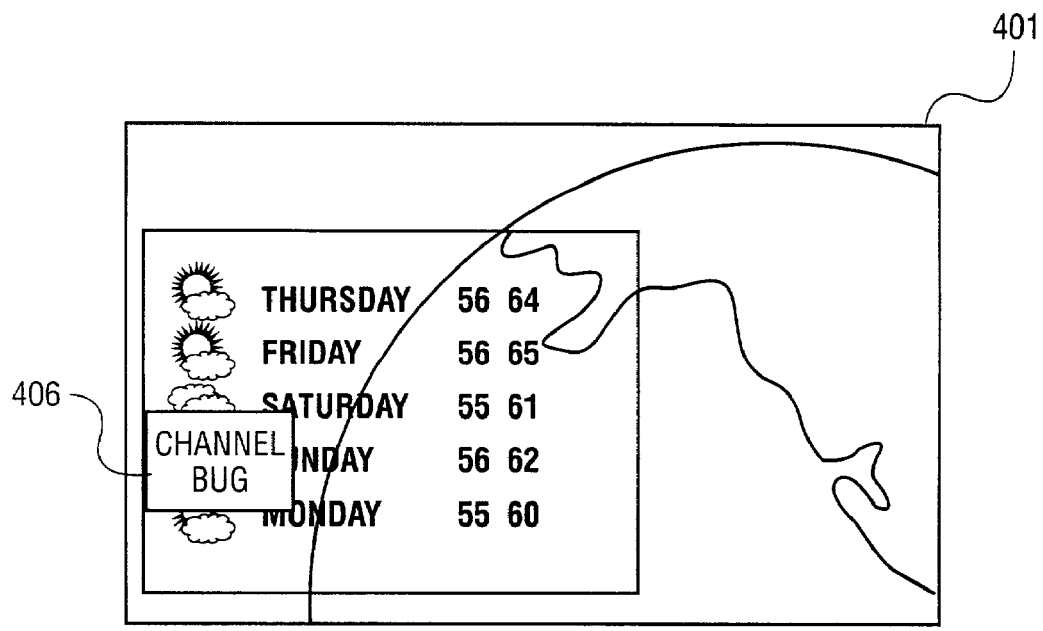
FIGS. 4A through 4C illustrate exemplary screen displays for using the interactive broadcast channel branding logo.
Figure 4B:
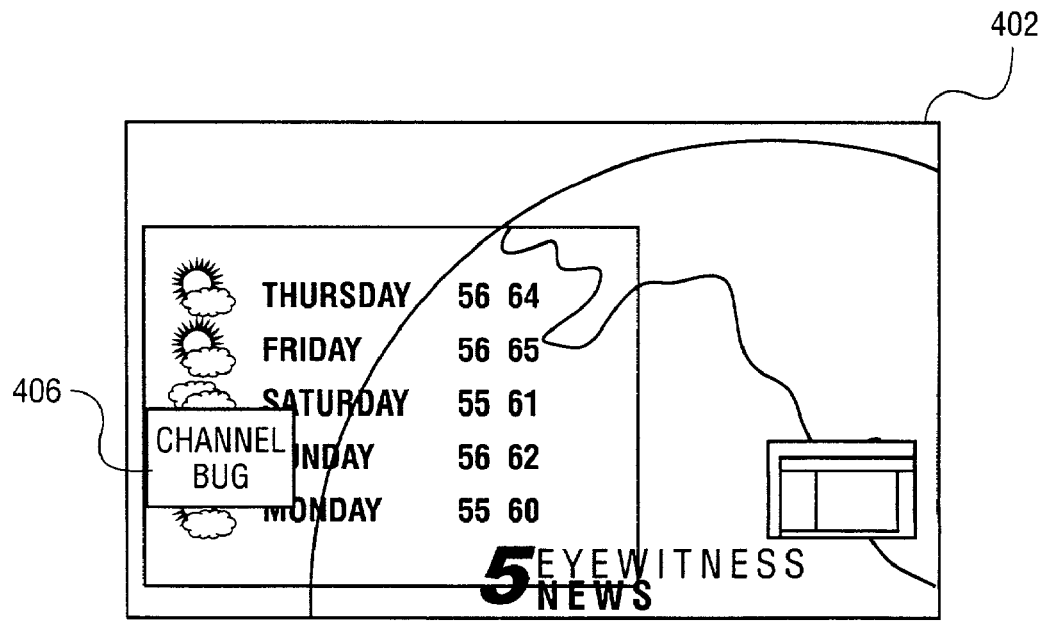
Figure 4C:
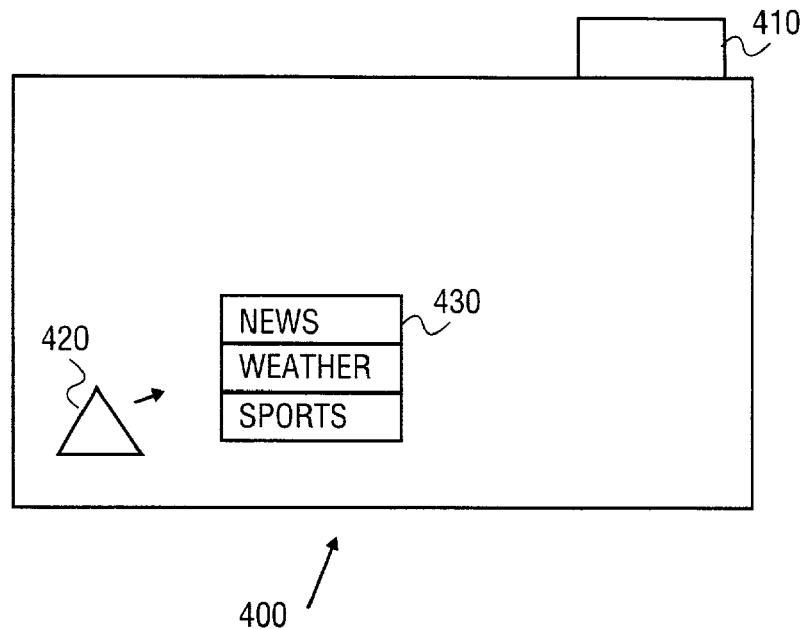

FIGS. 4A through 4C illustrate exemplary screen displays for using the interactive broadcast channel branding logo. Referring to FIG. 4A, an exemplary screen display 401 is shown for a weather related broadcast. A channel bug 406 is shown with the broadcast. Channel bug 406 can be any type of graphical object. For example, channel bug 406 can represent a specific TV station's logo (e.g., NBC's "peacock," CBS's "eye," etc.). For example, Channel bug 406 can change form, color, or shape to indicate to user that it can be used to facilitate interactive services as described above. Referring to FIG. 4B, an exemplary screen display 402 is shown having a channel bug 406, which is associated with extra content 407. Extra content 407 is a weather related chart that can be accessed via channel bug 406.

Referring now to FIG. 4C, there is shown a sample screen display 400 produced if an interactive broadcast channel branding logo ("channel bug") activates a rollout menu of services 430. By using, e.g., a remote control device that can be to a set-top box 410, a user can select channel bug 420 causing the rollout menu 430 of services to appear. As described above, a user may select various menu items (which may include news, weather, sports, hyperlinks to a web site, etc.). These items provide a user with a variety of interactive services in a manner well known in the art of interactive television systems.

Figure 5:
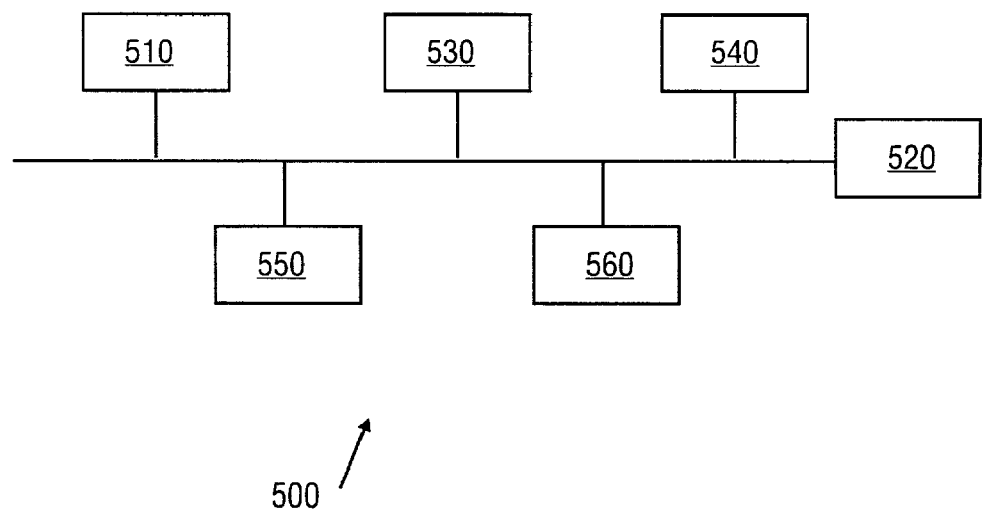
FIG. 5 illustrates a simplified internal block diagram of a computer system according to one embodiment.

The techniques described herein may be integrated into advanced Internet- or network-based knowledge systems as related to information retrieval, information extraction, and question and answer systems. FIG. 5 is an example of one embodiment of a computer system. The system has a processor 510 coupled to a bus 520. Also shown coupled to the bus 520 is a memory 530 which may contain executing code and graphical assets to morph the channel bug according to a signal embedded in a broadcast stream. Additional components shown coupled to the bus 520 are a storage device 540 (such as a hard drive, floppy drive, CD-ROM, DVD-ROM, etc.), an input device 550 (such as a keyboard, mouse, light pen, barcode reader, scanner, microphone, joystick, etc.), and an output device 560 (such as a printer, monitor, speakers, etc.). Of course, an exemplary computer system could have more components than these or a subset of the components listed.

The techniques described herein may also use a memory of a computer system (i.e., a set-top box) to store a set of instructions to be executed. In addition, the instructions to perform the techniques described herein may alternatively be stored on other forms of machine-readable media, including magnetic and optical disks. For example, the system and method of the present invention may be stored on machine-readable media, such as magnetic disks or optical disks, which are accessible via a disk drive (or computer-readable medium drive). Further, the instructions may be downloaded into a computing device over a data network in the form of a compiled and linked version, and/or set of graphical assets.

Alternatively, the logic to perform the techniques described herein may be implemented in additional computer and/or machine-readable media such as discrete hardware components as large-scale integrated circuits (LSD's), application specific integrated circuits (ASIC's), and firmware such as electrically erasable programmable read-only memory (EEPROM's).

Figure 6:
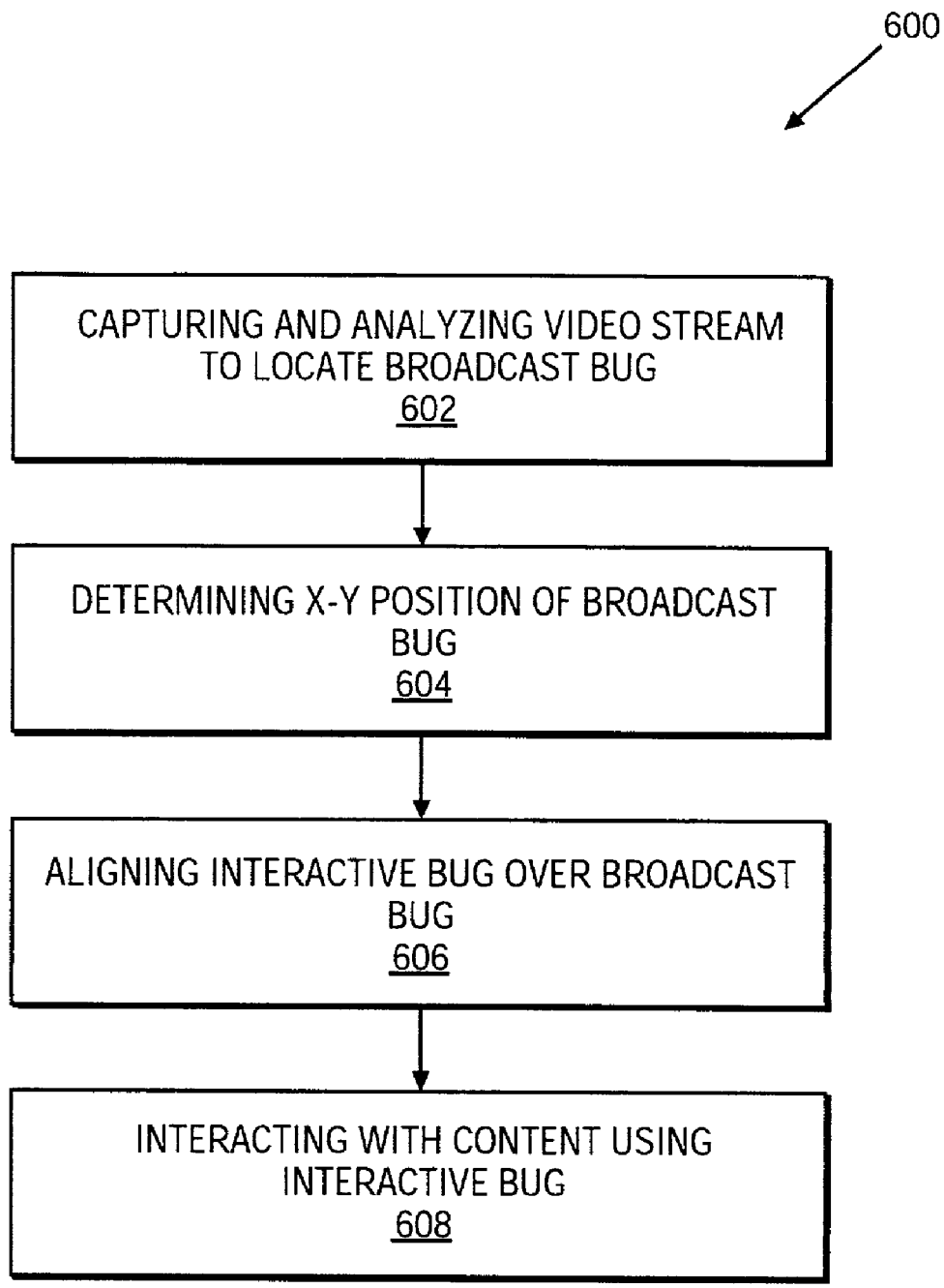
FIG. 6 illustrates a flow diagram of an operation to insert an interactive channel over a broadcast bug in a video stream.

FIG. 6 illustrates a flow diagram of an operation 600 to insert an interactive channel bug over a broadcast bug. That is, where traditional broadcast "channel" bug is broadcasted in a video stream. Initially, operation 600 begins at operation 602.

Figure 7A:
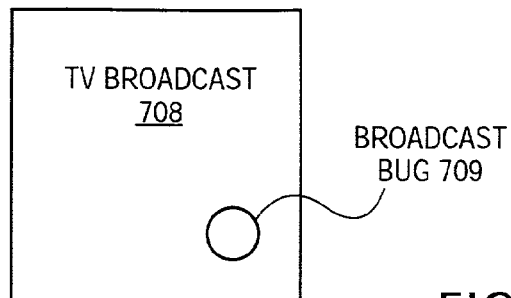
FIGS. 7A through 7D illustrate exemplary screen shots for the operation of FIG. 6.

At operation 602, a video stream is captured and analyzed to locate a broadcast bug. For example, as shown in FIG. 7A, a TV broadcast 708 is captured and analyzed to locate broadcast bug 709, which is represented by a "circle."

Figure 7B:
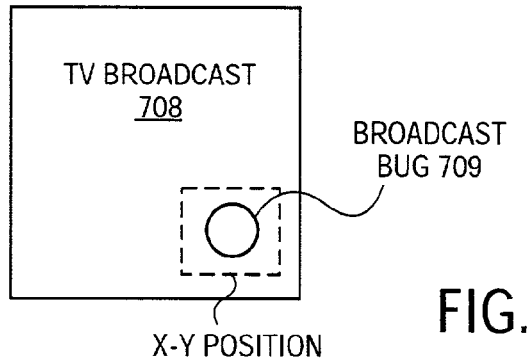

At operation 604, an X-Y position of the broadcast bug is determined. For example, as shown in FIG. 7B, the X-Y position represented by dashed lines is determined around broadcast bug 709.

Figure 7C:
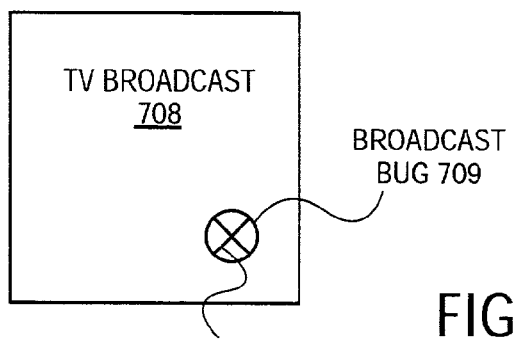

At operation 606, an interactive bug is aligned over the broadcast bug. For example, as shown in FIG. 7C, interactive bug 710 represented by the symbol "X" is aligned over broadcast bug 709. The screen shown in FIG. 7C can be displayed to a user.

Figure 7D:
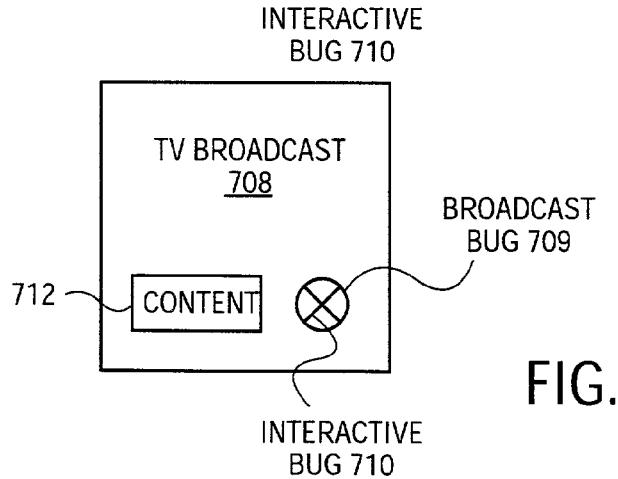

At operation 608, a user can interact with the interactive bug within the broadcast. For example, as shown in FIG. 7D, a user can access interactive bug 710 that launches or triggers display of content 712. The use can thus interact with content 712.

Figure 8:
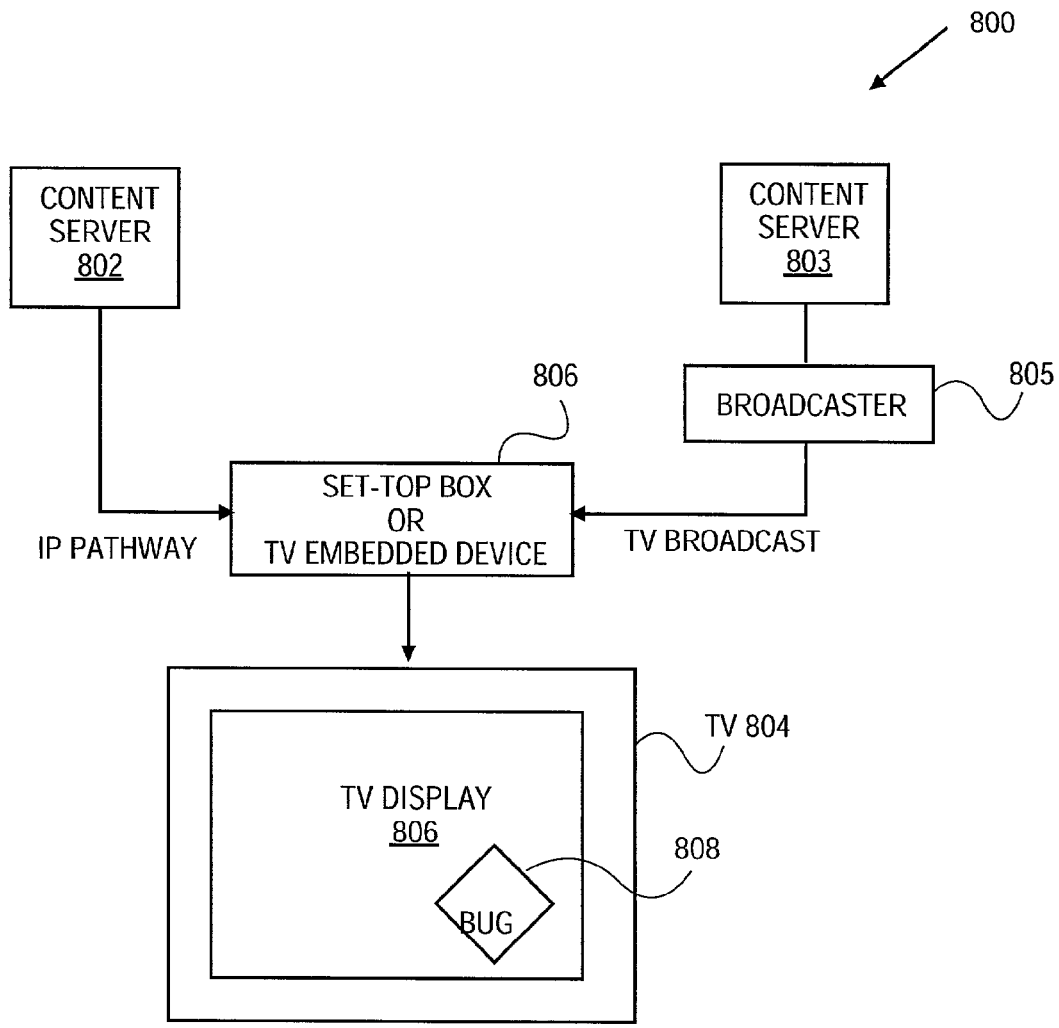
FIG. 8 illustrates one embodiment of an interactive television system receiving content from a content server via an IP pathway or from a content server via a broadcaster.

FIG. 8 illustrates an interactive system 800 receiving content from content server 802 via an IP pathway or from content server 803 via broadcaster 805. Referring to FIG. 8, interactive system 800 includes a set-top box or TV embedded device ("set-top box") 806 coupled to TV 104. Set-top box 806 can receive content from content server 802 via the IP pathway and from content server 803 via broadcaster 805.

Interactive system 800 includes a TV 804 having a TV display 806 with a bug 808. In one embodiment, bug 808 is displayed based on a trigger passing through a TV broadcast via broadcaster 805 or over an IP pathway via content server 802. Content for bug 808 may be embedded in the TV broadcast or may be resident in a memory within set-top box 806 or may come from the IP pathway. In one embodiment, bug 808 is rendered on TV display 806. For example, set-top box 806 can be configured with code or instructions to process the trigger to render bug 808.

In another embodiment, bug 808 is morphed, which can also be based on a trigger passing through a TV broadcast via broadcaster 805 or over an IP pathway via content server 802. Content for a morphed bug 808 may be embedded in the TV broadcast or may be resident in a memory within set-top box 806 or may come from the IP pathway.

Bug 808 can be used to launch interactivity. For example, a user can click on bug 808. If bug 808 is clicked, the an interactive application is launched. The interactive application can be launched from resident code within set-top box 806, or an application found in a logical memory store such as a broadcast file system, or from a remote content server such as content server 802 or content server 803. Bug 808 may also be an application in an of itself, e.g., a roll out menu. Bug 808 may also send a signal to another device to indicate a "buy" or a "vote" or request for additional information. Here, bug 808 may not launch any new interactivity and only cause some event to occur when the bug is clicked.

Thus, an interactive broadcast channel branding logo that provides interactivity for television viewers has been described. In the foregoing specification, the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative sense rather than a restrictive sense.

What is claimed is:

1. A non-transitory machine-readable storage medium providing instructions, which if executed by a processor, causes the processor to perform an operation comprising:
   receiving a video transmission;
   receiving a first interactive channel bug associated with a first content provider and a second interactive channel bug associated with a second content provider, wherein the first and the second interactive channel bugs comprise channel branding logos;
   morphing the first and the second interactive channel bugs into the video transmission, wherein the first and second interactive channel bugs are used to facilitate interactivity without a need for tuning to a dedicated channel associated with interactive services; and
   transmitting the video transmission with the first and second interactive channel bugs to a display system,
   wherein the first interactive channel bug is replaced by the second interactive channel bug during a change of displaying content from the first content provider to content from the second content provider, and
   wherein the first and the second interactive channel bugs are further configured to be displayed when triggered through an Internet Protocol (IP) pathway.

2. The non-transitory machine-readable medium of claim 1, further providing instructions, which if executed by the processor, causes the processor to perform an operation comprising: providing the first interactive channel bug as a graphical object.

3. The non-transitory machine-readable medium of claim 1, further providing instructions, which if executed by the processor, causes the processor to perform an operation comprising: selectively causing the first interactive channel bug to appear.

4. The non-transitory machine-readable medium of claim 1, further providing instructions, which if executed by the processor, causes the processor to perform an operation comprising: launching a functionality determined by the video transmission, the functionality capable of changing over time.

5. The non-transitory machine-readable medium of claim 1, further providing instructions, which if executed by the processor, causes the processor to perform an operation comprising: indicating an availability of new interactive services by changing a form of the first interactive channel bug.

6. The non-transitory machine-readable medium of claim 5, further providing instructions, which if executed by the processor, causes the processor to perform an operation comprising: indicating an availability of interactive services associated with the video transmission by the changed form of the first interactive channel bug.

7. The non-transitory machine-readable medium of claim 5, further providing instructions, which if executed by the processor, causes the processor to perform an operation comprising: indicating an availability of interactive services associated with a purchase of products or services by the changed form of the first interactive channel bug.

8. An apparatus comprising:
   a processor;
   a memory having stored therein computer executable instructions, that when executed by the processor, cause the apparatus to perform a method of:
   receiving a video transmission;
   receiving a first interactive channel bug associated with a first content provider and a second interactive channel bug associated with a second content provider, wherein the first and the second interactive channel bugs comprise channel branding logos;
   morphing the first and the second interactive channel bugs into the video transmission, wherein the first and second interactive channel bugs are used to facilitate interactivity without a need for tuning to a dedicated channel associated with interactive services; and
   transmitting the video transmission with the first and second interactive channel bugs to a display system,
   wherein the first interactive channel bug is replaced by the second interactive channel bug during a change of displaying content from the first content provider to content from the second content provider, and
   wherein the first and the second interactive channel bugs are further configured to be displayed when triggered through an Internet Protocol (IP) pathway.

9. The apparatus of claim 8, wherein the second interactive channel bug is a graphical object.

10. The apparatus of claim 8, wherein the first interactive channel bug is selectively morphed.

11. The apparatus of claim 8, wherein the first and the second interactive channel bugs are a launching point for interactive services.

12. The apparatus of claim 8, wherein the first interactive channel bug launches a functionality determined by a video transmitter or network operator, the functionality capable of changing over time.

13. The apparatus of claim 8, wherein a form of the first interactive channel bug changes to indicate availability of new interactive services.

14. The apparatus of claim 13, wherein the changed form of the first interactive channel bug indicates the availability of interactive services associated with the video transmission.

15. The apparatus of claim 13, wherein the changed form of the first interactive channel bug indicates the availability of interactive services associated with a purchase of products or services.

16. A method for providing interactive content comprising:
   capturing and analyzing a video stream to locate a non-interactive video transmission bug;
   determining a position of the non-interactive video transmission bug;
   aligning a first interactive bug associated with a first content provider over the non-interactive video transmission bug at the position without user intervention;
   displaying the first interactive bug over the video transmission bug within the video stream; and
   replacing the first interactive bug with a second interactive bug associated with a second content provider during a change of displaying content from the first content provider to content from the second content provider,
   wherein the first and the second interactive bugs comprise channel branding logos and
   wherein the first and the second interactive bugs are further configured to be displayed when triggered through an Internet Protocol (IP) pathway.

17. A method comprising:
   transmitting a video transmission;
   transmitting a first interactive channel bug associated with a first content provider
   and a second interactive channel bug associated with a second content provider, wherein the first and the second interactive channel bugs are configured to be morphed into the video transmission, wherein the first and second interactive channel bugs are further configured to be used to facilitate interactivity without a need for tuning to a dedicated channel associated with interactive services, wherein the first interactive channel bug is configured to be replaceable by the second interactive channel bug during a change of displaying content from the first content provider to content from the second content provider, wherein the first and the second interactive channel bugs comprise channel branding logos, and wherein the first and the second interactive channel bugs are further configured to be displayed when triggered through an Internet Protocol (IP) pathway.

* * * * *

UNITED STATES PATENT AND TRADEMARK OFFICE
CERTIFICATE OF CORRECTION

PATENT NO. : 8,296,792 B2
APPLICATION NO. : 09/841018
DATED : October 23, 2012
INVENTOR(S) : Ranjit Sahota et al.

It is certified that error appears in the above-identified patent and that said Letters Patent is hereby corrected as shown below:

In the Specifications

In Column 5, Line 14:
Please delete "trigger, to say" and insert --trigger, say--.

Signed and Sealed this
Sixth Day of August, 2013

Teresa Stanek Rea
*Acting Director of the United States Patent and Trademark Office*